J. F. ROBB.
CONTROL MECHANISM FOR CALCULATING MACHINES.
APPLICATION FILED JUNE 29, 1916. RENEWED NOV. 6, 1919.
1,421,719.
Patented July 4, 1922.
4 SHEETS—SHEET 1.
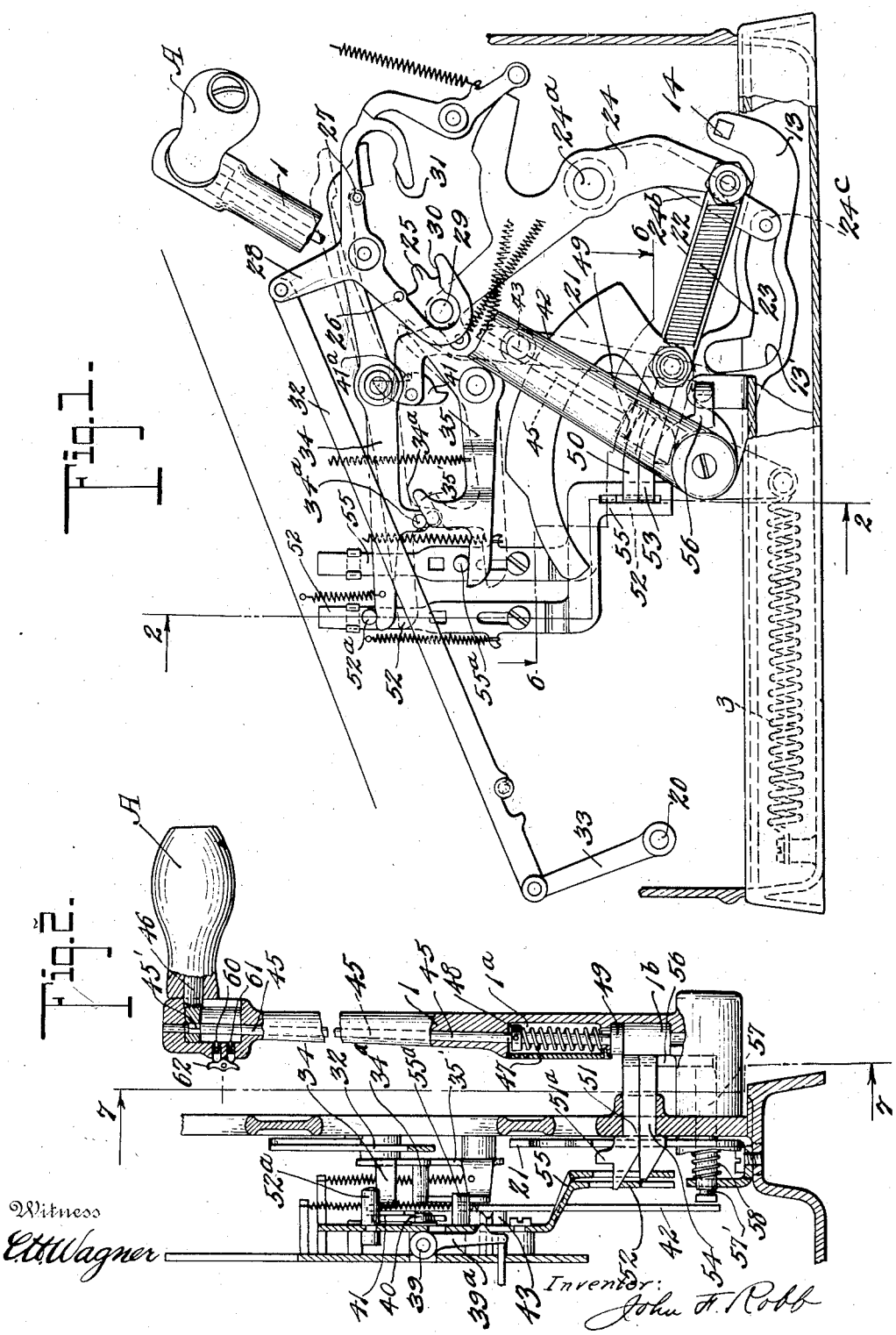

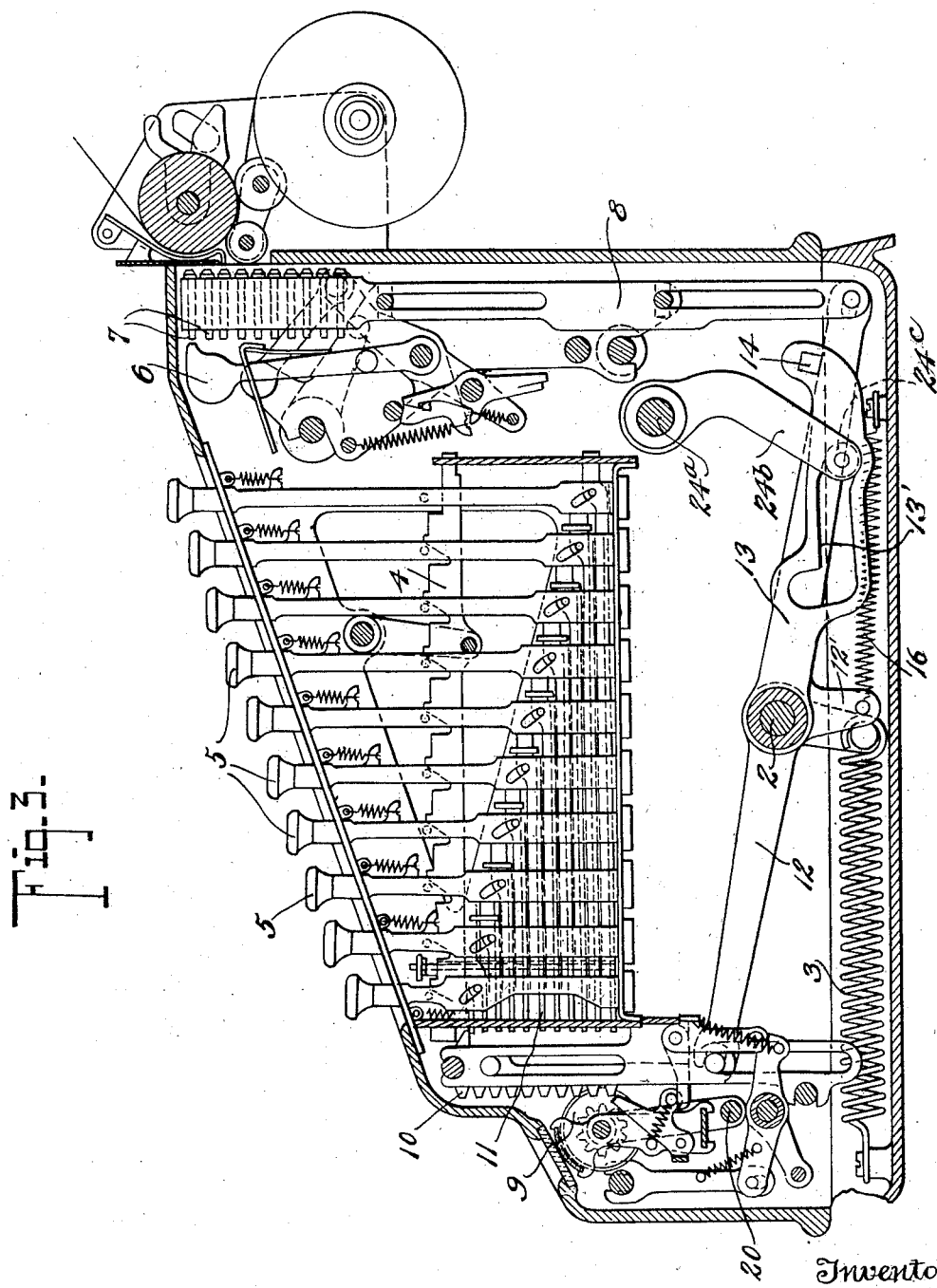

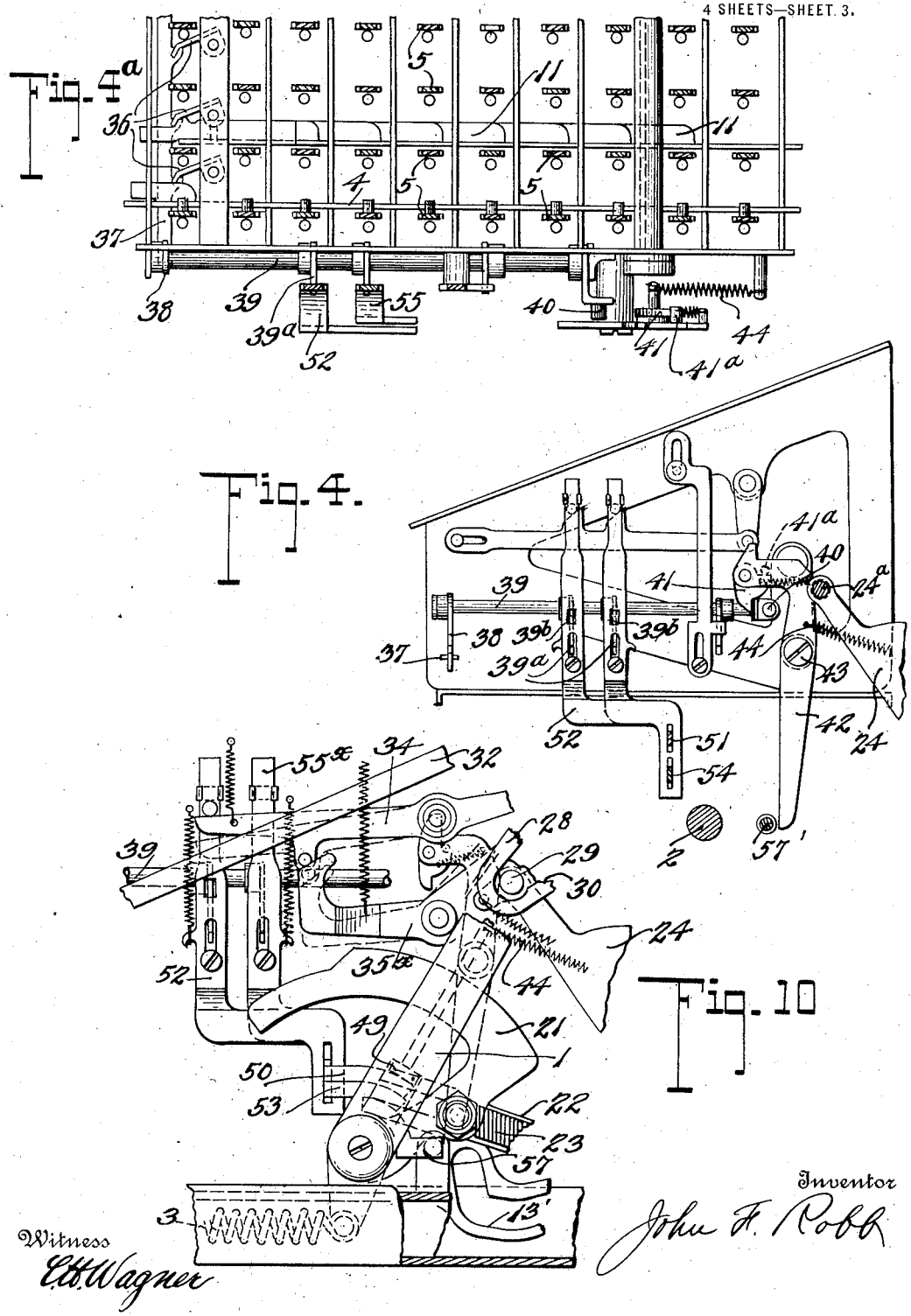

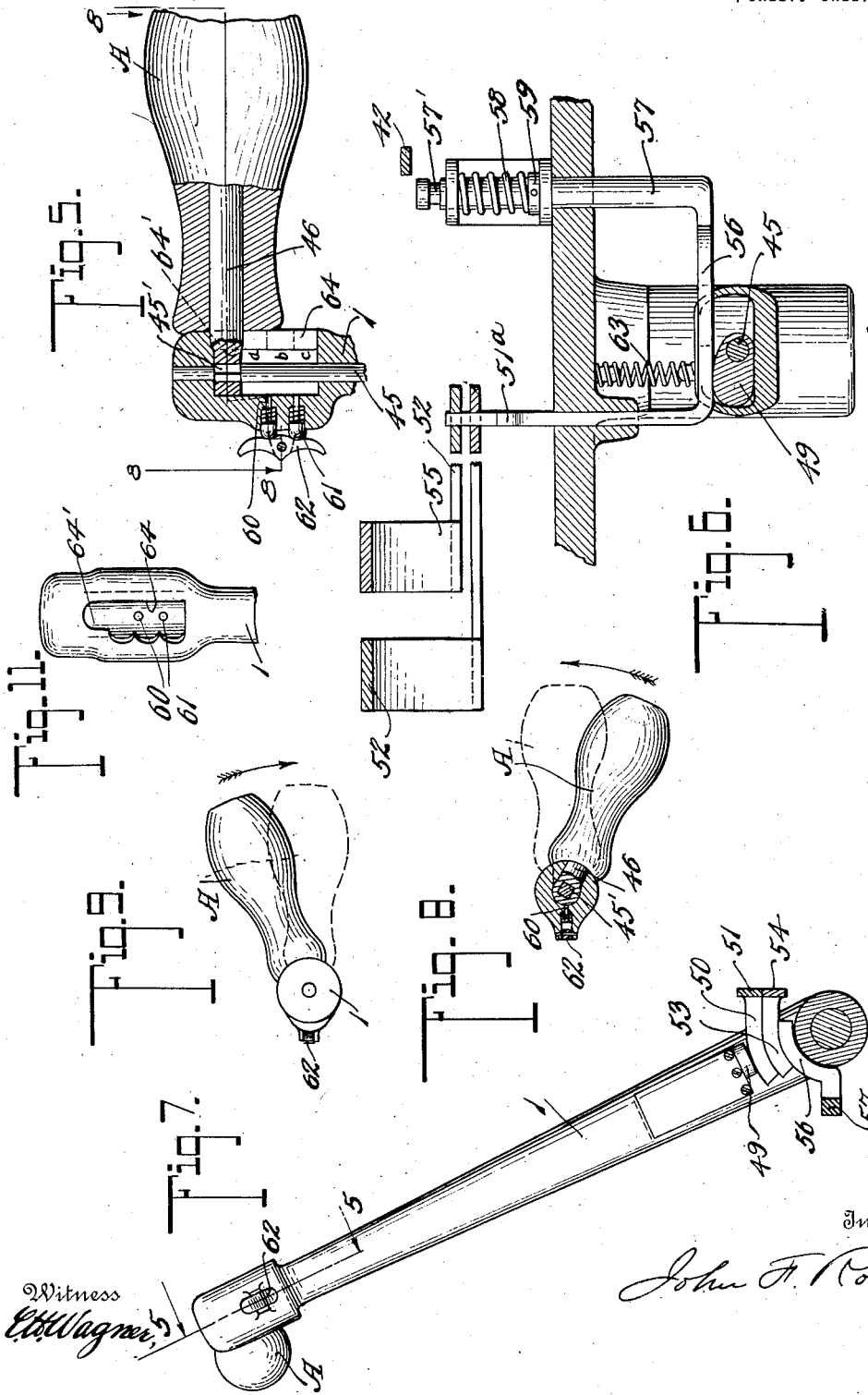

UNITED STATES PATENT OFFICE.

JOHN F. ROBB, OF CLEVELAND, OHIO.

CONTROL MECHANISM FOR CALCULATING MACHINES.

1,421,719. Specification of Letters Patent. Patented July 4, 1922.

Application filed June 29, 1916, Serial No. 106,657. Renewed November 6, 1919. Serial No. 336,235.

*To all whom it may concern:*

Be it known that I, JOHN F. ROBB, a citizen of the United States, residing at Cleveland, Ohio, have invented certain new and useful Improvements in Control Mechanism for Calculating Machines, Etc., of which the following is a specification.

The present invention relates to accounting machines of the key-set, crank operated type commonly in use, and is a continuation of the invention of my previous application Serial Number 76,201 filed February 4th, 1916, which I have permitted to become abandoned in favor of this application.

As is well known in the type of accounting machines above referred to designed especially for accumulating and listing or registering items, it is customary to employ amount keys for controlling the setting up of ordinary items on the machine, together with special keys for controlling abnormal operations of the machine such as total, sub-total, repeat and similar operations.

The particular purpose of the improvements of this invention is to eliminate the necessity of employing a plurality of special keys or like devices for controlling the special or abnormal operations of the machine, and to this end I contemplate the provision upon the main actuator or crank handle of the machine of means to predetermine such abnormal operations as totalling, sub-totalling, repeat, key normalizing or keyboard correction and the like.

While in my previous application there is proposed the employment of totalling and repeat control instrumentalities on the crank handle of the accounting machine, the present invention has to do primarily with the provision of an improved construction of said instrumentalities in addition to which I now provide sub-total control means on the handle. Perhaps the most essential phase of the present improvements, however, resides in the utilization of the handle for the main operating crank as a means to selectively predetermine either totalling, sub-totalling or repeating actions of the accounting machine, which actions I characterize as abnormal to distinguish the same from the normal itemizing or accounting transactions performed by the machine. Furthermore, in the present invention the handle for the main operating crank is so designed and connected with associated control parts that the handle pull upon the said handle, namely forwards, after it has been selectively positioned for the particular abnormal operation of the machine, effects an initial operation or setting of the special control parts, whereupon the subsequent forward pull upon the handle operates the accounting machine instrumentalities in the customary manner for the completion of its work.

I provide special means whereby when the handle of the main operating crank is in its normal position, as distinguished from the selective positions which it may assume for predetermining and setting the special control, totalling, sub-totalling and repeat instrumentalities, said handle will be maintained rigid or substantially in the same cooperation with respect to the crank itself as are the ordinary handles of accounting machines of the class improved upon.

The advantages of what I term my "handle control" for adding and similar accounting machines have been fully set forth in my previous application as regards the totalling and repeating operations of the machines. To exemplify one advantage of the said handle control relative to sub-totalling operation it may be noted that in many types of adding machines now in use it is customary for the operator to follow with his left hand a column of figures being set up on the machine, using his right hand for operating the keys and the crank handle. In such machines where the sub-total and other special keys are located at the left side of the keyboard the operator must needs remove his left hand from the column of figures in order to use said hand for depressing the sub-total key, for instance. In this way a mistake in following the figures of a column is liable to be caused, something which would be avoided in the practical embodiment of the present invention where the special transaction of sub-totalling, as well as others, is susceptible of being performed by the right hand as it grasps the handle of the operating crank of the machine. Other advantages, of course, exist for the present improvements and will be obvious to those skilled in the particular art to which my invention appertains.

The invention consists also in certain detail construction and arrangement of parts comprised in the control means just generally described, all of which will be more fully understood in connection with the following detail description and the accompanying drawings, in which—

Figure 1 is a fragmentary view in elevation showing particularly the control mechanism of the invention in association with the control parts by which the adding pinions of the accumulating mechanism are thrown into and out of operative engagement with respect to the adding racks.

Figure 2 is a sectional view taken about on the line 2—2 of Figure 1.

Figure 3 is a sectional view of an adding machine showing clearly the keyboard accumulating and listing instrumentalities.

Figure 4 is a fragmentary view in elevation showing more particularly the arrangement of the repeat control lever.

Figure 4[a] is a view looking down upon the keyboard mechanism, showing more clearly the lock plates cooperating with the indexing stops and the release means therefor.

Figure 5 is a fragmentary view of the upper end portion of the handle, taken about on the line 5—5 of Figure 7.

Figure 6 is a sectional view taken about on the line 6—6 of Figure 1.

Figure 7 is a sectional view taken about on the line 7—7 of Figure 2.

Figure 8 is a section taken on the line 8—8 of Figure 5.

Figure 9 is a view looking down upon the handle and crank, practically an endwise view.

Figure 10 is a fragmentary view of a modification of the invention.

Figure 11 is a view of the upper end of the crank with the handle removed.

*General construction of accounting machine.*

The accounting machine to which the present improvements are applied is known as the International adding and listing machine. Since my invention does not involve any features of the regular item keys of the keyboard or the accumulating and listing mechanism, the latter will be briefly set forth. Such mechanism is practically the same as disclosed in the application of Nelson White, Serial Number 755,817 filed March 20, 1913, now Letters Patent No. 1,192,721, issued July 25th, 1916, and the application of Sorum and Brockman, Serial Number 854,836, filed August 3rd, 1914.

The crank 1 of the machine is carried by a main shaft 2, the latter having an arm to which is connected a normalizing spring 3, seen best in Figure 1. Suitable amount keys 5 are adapted to operate the zero stop and locking bars 4. The members 4 coact with the adding racks 10 in the well known manner, said racks cooperating with the pinions of the adding wheels 9 of the accumulating mechanism. The movement of the racks 10 is limited differentially by the indexing stops 11 one of which is operable by each key 5, and a series of which index stops is provided for each row of the keys 5. The listing mechanism of the machine may be of any conventional type and includes the hammers 6 and the types 7 adapted to be impinged thereby, said types being carried by the type carriers 8. Each adding rack 10 is connected at its lower end with one end of a lever 12, the other end of said lever being connected with a type carrier 8 associated with said rack. Of course a series of levers 12 will be provided, the number depending upon the number of the adding racks and type carriers. Each lever 12 has an arm 12' to which is attached a spring 16 whereby the lever under the action of the spring normally tends to move the rack 10 with which it is connected in a downward direction, and correspondingly lift the associated type carrier 8. On the shaft 2 is supported a release bail for the levers 12 which bail includes the side arms 13 having the crooked slots 13' therein, and a cross bar 14 connecting the arms 13 and engageable with the upper edges of the levers 12 at their rear ends whereby to hold said levers in the positions shown in Figure 1, or permit tilting of the levers under the action of the springs 16 and differential control of the stops 11, when the member 14 is raised by the arms 13, an action which takes place on every forward movement of the crank handle 1, the movement of which rocks the shaft 2.

Rigidly mounted on the shaft 2 to rock therewith is a sector plate 21 connected at its rear portion by a flexible connection consisting of a plate 22 and coiled spring 23, with the control lever 24. The lever 24 carries at its upper end a wipe pawl 25 adapted to coact with studs 26 and 27 on a three-armed lever 28 to tilt said lever at certain times during the movement of the lever 24. The lever 24 also carries a roller 29 adapted to coact with cams 30 and 31 at the lower hook portions of the lever 28 to likewise rock the lever 28 at certain periods of movement of the lever 24. The lever 28 is connected by a link 32 with an arm 33. The lever 24 is fixed to a shaft 24[a] having arms 24[b] fixed thereto, said arms having rollers 24[c] operating in the slots 13' to raise and lower the members 13 and 14. The arm 33 is attached to the rock shaft 20 on which rock shaft, as seen in Figure 1, is mounted the carrier frame of the accumulating mechanism, in which frame are supported the various adding wheels and certain control parts of the transfer mechanism which need not be set forth in detail. It suffices to say that in accordance with the tilting of the lever 28 the pinions of the adding wheels 9 will be thrown into mesh with the racks 10 either on the down movement of said racks as when taking a total, on the up movement of said racks as when doing ordinary accumulating, or continued in mesh with the racks both on their downward and upward excursions, as when sub-totalling. The foregoing is the well known operation of various types of adding machines in common use, exemplified by White U. S. Letters Patent No. 1,192,721, issued July 25, 1916, and the engagement of the wipe pawl 25 with the studs 26 and 27 is controlled by a total lever 34 and a sub-total lever 35 each of these levers having rear end portions adapted to be moved into or out of engagement with the pawl 25 to govern its cooperation with the lever 28.

A reference to Figures 4 and 4ª will disclose that the indexing stops 11 are adapted to be engaged when moved forward by their pin and slot connections with the keys, by the locking plates 36 one of which is provided to coact with the stops of the series for each particular row of keys. A release bar 37 is positioned to engage all of the plates 36, and is arranged transverse to the keyboard at its front portion, and is adapted to be shifted slidably by an arm 38 carried by a release shaft 39. On the shaft 39 is an arm 40 disposed in the path of a release dog 41 on a release lever 42 which is pivoted at 43 (see Figure 4).

A spring 44 normally tends to pull the release lever 42 rearwards and said lever is supported in the position shown in Figure 4 by the control lever 24 previously referred to and shown in Figure 2. The lever 24 has a stud 24ª engaging the rear edge of the lever 42 so that when the parts of the machine are at rest the lever 24 in its normal position maintains the lever 42 as seen in Figure 4. There is a pin 41ª on the lever 42 adapted to engage the heel of the dog 41 to facilitate the following action. As the handle 1 is pulled forwards the lever 24 is moved rearwards and under normal conditions the relieving of the pressure of the stud 24ª of said lever 24 against the rear of the lever 42 permits the lever 42 to likewise move rearwards. In such movement of the lever 42 the dog 41 carried thereby idles rearwards over the arm 40, not effecting action of the release shaft 39. When the handle 1 is released, however, and returns to its normal rearward position the lever 24 moves forwards, its stud 24ª abuts with the lever 42 which has previously rocked under the action of the spring 44, and restores said lever 42 to its normal position as seen in Figure 4, during which operation the dog 41 held from rocking rearwards owing to its abutment with the pin 41ª, strikes the arm 40 and rocks the release shaft 39 so as to cause the arm 38 of said shaft 39 to shift the release bar 37 and release all of the depressed keys 5 of the keyboard.

Handle control.

Referring particularly to Figures 2, 3 and 5 to 9 inclusive, it will be noted that the crank 1 is equipped with the operating handle A adapted to be grasped in the usual manner. This handle A, however, is peculiarly mounted on the crank being directly supported by a shaft 45 preferably but not necessarily housed by the crank 1. The shaft 45 is provided with a square portion 45' passing through the square opening in the round bar 46 carrying the handle A. The upper end of the shaft is reduced so that a shoulder is formed at the inner extremity of the square portion 45' which shoulder forms a bearing to enable pressure to be exerted downwardly and longitudinally on the shaft 45, by means of the handle A. As seen best in Figures 2, 6 and 7, at the lower portion of the crank 1 there is provided a cavity or recess 1ª in which is mounted a coiled spring 47 encircling the shaft 45 and bearing at its upper end against a collar 48 fixed to said shaft. The lower end of the spring 47 interlocks with the lower end of the recess 1ª by entering a depression therein, and the upper end of the spring likewise interlocks with the collar 48 by entering a depression therein. The spring 47 performs a dual function in that it normally tends to maintain the handle A and shaft 45 at the position of endwise movement shown in Figure 3, and likewise tends to hold the handle at the limit of rotative movement illustrated by the full lines in Figure 9. On its lower extremity the shaft 45 carries a cam 49 which cam is shiftable with the shaft, by downward depressing movement of the handle A into any one of three different positions other than normal. By a preliminary increment of movement of the shaft 45 and handle A the cam 49 will assume a position opposite the pressure arm 50 of a cam slide 51 cooperative with a total slide 52; two increments of movement of the cam 49 will position the same opposite the pressure arm 53 of the cam slide 54 cooperative with a sub-total slide 55 (see Figures 2 and 3); and three increments of movement of the cam 49 by which it is carried from the upper end of the recess 1ᵇ of the crank 1 to the extreme lower end of said recess, will position the cam opposite the pressure arm 56 of a repeat control slide 57, seen best in Figure 6. The pressure arms 50 and 53 of the total and sub-total slides curve upwardly and forwards from the axis of the crank 1 whilst the pressure arm 56 for the repeat control slide 57 curves downwardly and rearwards, from said axis (see also Figure 7).

The repeat control slide 57 is acted upon by a spring 58, see Figure 6, engaging a collar 59 on the slide and normally tending to hold the slide outwardly projected from the casing of the machine through which the slide passes. The slide 57 has a grooved inner end portion 57' adapted to be engaged by the lower extremity of the release lever 42.

With the foregoing in mind, the manner in which the control of repeat operations of the machine is effected may now be set forth.

Assuming that an item has been set up on the keys 5 of the keyboard and the latter are locked depressed through the cooperation of the locking plates 36 with the indexing stops 11, should the operator desire to repeat the transaction represented by depressed keys he will grasp the handle A of the crank 1 in the customary way for the operation of said crank. Instead of pulling the crank immediately forward by means of the handle A, he will force the handle A downwards by the necessary pressure opposing the tension of the spring 47, until said handle, its shaft 45, and the cam 49 reach the lower limit of their movement with the cam 49 opposite the pressure arm 56 of the repeat control slide 57. Upon now pulling the handle A and thereby the crank 1 forwards the preliminary movement of the handle A is to rotate with the shaft 45, upon the crank 1, the rotative movement being limited by the size of the opening in the upper end of the crank through which the bar 46 of the handle A passes. Said rotative movement of the handle A is sufficient, however, to preliminarily force the repeat control slide 57 inwards through the action of the cam 49 so that the inner end of said slide 57 interferes with a rocking movement of the release lever 42, as the control lever 24 moves rearwards on forward movement of the handle. The slide 57 is held inwards by interlocking of the lever 42 with the grooved inner end of the slide. It is in this manner that the rocking of the release lever 42 is prevented and release of the keys set likewise prevented, and thus on the next pull on the handle A forwards the transaction set up on the keys 5 which have not been released, will be repeated. Said transaction may be repeated, furthermore, so long as the operator desires merely by the downward and rotative movement of the handle A on the crank 1 in the manner described.

We now come to the control of totalling and sub-totalling operations, abnormal operations, of course, of the machine, from the handle A. Referring to Figure 5 it will be observed that a total top 60 and a sub-total stop 61 are mounted on the crank 1 at its upper end, spring retracted and movable inwards each to assume a position in the path of the adjacent projecting portion of the member 46, through the operation of a finger piece 62 common to said stops. It is by these stops that the degree of movement of the handle A sufficient to position the cam 49 opposite either the pressure arm for the cam slide 51 or the cam slide 54 is conveniently regulated. In other words, if it be desired to take a total on the machine the operator will grasp the handle A, and depress with his thumb the upper end of the finger piece 62, thereby projecting the stop 60 into the path of the member 46. Downward pressure on the handle A will permit of its movement to what may be termed its first selecting position $a$ of its three selecting positions marked $a$, $b$ and $c$ in Figure 5. The subsequent forward pull on the handle A and operation of the shaft 45 and cam 49 serves to push the cam slide 51 inwards and the cam at the inner end of said slide engages with a slot in the lower end of the total slide 52 so as to pull downwardly upon said slide against the tension of an upraising spring attached thereto. The slide 52 has a stud $52^a$ engaging over the front end of the total lever 34 whereby said lever may be rocked to raise its rear end, a stud $34^a$ on the lever 34 engaging a cam 35' of the sub-total lever 35 and raising the rear end of the latter, all as an incident to downward movement of the slide 52 by the action of the cam slide 51. When so adjusted, obviously the lever 34 permits the wipe pawl 25 to engage the stud 27 and cause the accumulator and printing devices to operate properly for the taking of a total, the lever 25 permittng the pawl 25 to engage the stud 26.

The operation of the sub-total taking means is similar to that when a total is to be taken, the only difference being that the lower portion of the finger piece 62 is pressed inwards to cause the stop 61 to limit the movement of the handle and shaft A downwards to the second position $b$ wherein the cam 49 will operate the cam slide 54 and correspondingly actuate the sub-total slide 55, the latter having the stud $55^a$ engaging over the sub-total lever 35 previously described. The sub-total lever 35 only is depressed when the sub-total is taken, said lever being operable independently of the total lever 34, whereas the converse is not true.

Each of the total and sub-total slides 52 and 55 is adapted to be locked in its actuated position, once operated by the handle A moving on the crank 1, by a locking and release member $39^a$ carried by the release shaft 39. The said locking member $39^a$, one for each of the slides 52 and 55, is adapted to engage in a slot $39^b$ in the slide to hold it depressed and the members 52 and 55 are released automatically as an incident to the movement of the crank 1 by the cooperation of the release lever 42 and its dog 41 with the arm 40 on the release shaft. Another peculiarity of the construction just referred to resides in the cooperation of a projection $51^a$ on the cam slide 51 with the sub-total slide 55. When the total slide 52 is pulled downwards by the total cam slide 51 the projection 51ª engages the upper end of a slot in the sub-total slide 55 so as to prevent any movement of said slide when the totalling operation is to be effected. In like manner the movement of the cam slide 54 for sub-totalling operations, immediately causes the inner end of said slide to engage in a slot at the lower end of the total slide 52 to prevent any downward movement of the latter during the sub-total taking operation.

The movement of the slides 51 and 54 in an outward direction to restore the same to normal is compelled by suitable springs 63 interposed between the casing of the machine and the pressure arm of each of said slides, and seen best in Figure 6.

It will be evident that by carrying out the principle of operation described in regard to the total and sub-total keys, should it be desired a slide 55ˣ (see Fig. 10) similar to one of the slides 52 or 55 may be employed, but having no connection with a total or sub-total lever, and used merely for the purpose of actuating the release shaft 39 to release any depressed keys. In this manner the manipulation of the handle A in cooperation with such a slide as just proposed may be utilized to correct the keyboard or in other words to obtain the resetting action of the keys incident to the operation of the usual error key provided for accounting machines. In other words, the omission of the member 55ª and shortening of the lever 35 would convert the member 55 into a key release device operable from the handle A by the described member 50, and a modification of this character is shown in Figure 10, and it is not thought necessary to describe the same in greater detail, (see parts 55ˣ and 35ˣ in Figure 10).

It is notable that when the handle A is at the upper limit of its movement, or in what may be termed its normal position with respect to the crank 1, said handle is disposed with the inner end of its member 46 seated in a relatively narrow upper end portion 64' of the slot 64 through which said member 46 passes to its point of connection with the upper end of the shaft 45. Under such conditions it will be obvious that no rotative movement of the handle A with the shaft 45 as an axis is permitted, such arrangement and construction being desirable because for all practical purposes while the handle is in its normal position it is as rigid on the crank 1 as the ordinary handle of an adding machine. On reference to Figures 8 and 9 the normal position of the handle A will be seen in full lines in Figure 9 and its range of relative movement on the crank 1 is depicted in both figures by the full and dotted lines. Figure 11 shows the slot portions 64 and 64'.

The expression "normal and abnormal operation of the accounting mechanism" as used in the claims found hereinafter refers to that normal operation of the machine incident to the setting up of ordinary transactions and accumulating or listing them, as distinguished from abnormal operations when totalling, sub-totalling, repeat or key restoring actions of the machine are compelled, the latter being really irregular transactions or operations.

While of course the present invention is shown in its adaptation to the control mechanism of one type of adding machine, it is to be understood that the peculiar "handle control" forming the essence of the invention is susceptible of being adapted to the constructions of various other types of adding machines at present in common use.

Having thus described my invention, what I claim is:

1. In an accounting machine, the combination, with accounting mechanism for taking totals, manipulative devices for predetermining the action thereof and handle means for effecting a normal operation of said mechanism for regular transactions of the machine, of means operable by initial movement of the handle means in the direction of its movement for effecting a normal operation of the machine whereby to compel total taking operation of the machine.

2. In an accounting machine, the combination, with accounting mechanism, manipulative means for predetermining the action of said accounting mechanism and handle means for effecting a normal operation of said mechanism for regular transactions of the machine, said handle means including a crank and a handle for pulling the crank to effect regular operation of the machine, of means operable as an incident to movement of said handle relatively to the crank and in the direction of its ordinary movement for pulling the crank whereby to compel an abnormal operation of the accounting mechanism.

3. In an accounting machine, the combination, with accounting mechanism, manipulative means for predetermining the action of said accounting mechanism, and handle means for effecting normal operation of said mechanism for regular transactions of the machine, said handle means including a main operating crank, a handle for said crank, means intermediate the handle and crank for maintaining the handle relatively rigid in respect to the crank when the handle is operated for causing regular operation of the accounting mechanism, the last mentioned means being operable to permit rotative movement of the handle on the crank, and means adapted to be operated from the handle in its rotative movement for controlling an irregular operation of the accounting mechanism.

4. In an accounting machine, the combination, with accounting mechanism, manipulative means for predetermining the action of said accounting mechanism, handle means for effecting a normal operation of said mechanism for regular transactions of the machine including a crank, a handle for said crank, a connection intermediate the handle and crank for holding the handle rigid against movement relative to the crank and permitting rotative relative movement by adjustment of the handle, and means adapted to be operated as an incident to the rotative movement of the handle on the crank for compelling an abnormal operation of the accounting mechanism for an irregular transaction of the machine.

5. In an adding and listing machine, the combination of accumulating and listing mechanism, manipulative means for setting the said accumulating and listing mechanisms for ordinary accumulating and listing operations, main operating means for said mechanisms including a main actuator, a handle for said actuator, and means operable from said handle for causing sub-totalling action of the accumulating and listing mechanism.

6. In an adding and listing machine, the combination of accumulating and listing mechanism, manipulative means adapted to be set to control the said accumulating and listing mechanisms for ordinary accumulating and listing operations, main operating means for said mechanisms including a main actuator, a handle for said actuator, and means operable from said handle previous to the movement of the main actuator for normalizing the manipulative means aforesaid.

7. In an adding and listing machine, the combination of accumulating and listing mechanism, manipulative means adapted to be set to control the said accumulating and listing mechanism for ordinary accumulating and listing operations, main operating means for said mechanisms including a main actuator, a handle for said actuator, and means operable from said handle previous to movement of the main actuator for controlling either restoration of the manipulative means above mentioned, or the action of the accumulating and listing mechanism whereby to perform a total taking operation.

8. In an accumulating and listing machine, the combination with accumulating and listing mechanism, manipulative keys adapted to be set to control the said mechanism for predetermining accumulation and listing of amounts on said machine, a main actuator for operating the accumulating and listing mechanisms, total, sub-total and repeat control devices, a handle for the main actuator, and means intermediate the said handle and said total, sub-total and repeat control devices for preliminarily setting any one of the latter for operation by movement of the handle previous to operation of the main actuator thereby.

9. In an accounting machine, the combination with accounting mechanism, manipulative keys adapted to be set to control the said mechanism for predetermining accounting of amounts on said machine, mechanism for restoring the manipulative keys whereby to correct the keyboard, a main actuator for operating the accounting mechanism, a handle for moving the said actuator, and means intermediate the said handle and key restoring mechanism for operating the latter by the movement of the handle.

10. In an accumulating machine, the combination with accumulating mechanism, manipulative keys adapted to be set to control the said mechanism for predetermining accumulation of amounts on said machine, mechanism for restoring the manipulative keys whereby to correct the keyboard, a main actuator for operating the accumulating mechanism, a handle for moving the said actuator, means intermediate the said handle and key restoring mechanism for operating the latter from the handle, and a connection intermediate the handle and the main actuator for permitting a preliminary movement of the handle independently of said actuator whereby to cause cooperation of the handle with said key restoring mechanism.

11. In an adding and listing machine, the combination of accumulating and listing mechanism, manipulative keys for setting up amounts of transactions on said mechanism, a main actuator comprising a crank, a handle for said crank, a shaft on the crank connecting the said handle, a totalling device controlling the action of the accumulating and listing mechanism, and means operable by said handle and shaft for actuating said totalling device.

12. In an adding and listing machine, the combination of accumulating and listing mechanism, manipulative keys for setting up amounts on said mechanism, a main actuator comprising a crank, a handle for said crank, a shaft on the crank connecting the said handle with the crank, totalling, sub-totalling and repeat control devices for the accumulating and listing mechanism, and cam means on said shaft operable by the handle and shaft and adapted to be selectively placed in cooperation with either the total, sub-total or repeat control devices for operating the latter.

13. In an adding and listing machine, the combination of accumulating and listing mechanism, manipulative keys for setting up the amount of a transaction on said mechanism, total and repeat control devices for said mechanism, a main actuator for said mechanism, a handle for operating said main actuator, and means intermediate said handle and said total and repeat control devices for actuating the latter and including a shaft longitudinally movable on the main actuator and a cam on said shaft movable selectively for cooperation with said total and repeat control devices.

14. In an adding and listing machine, the combination of accumulating and listing mechanism, manipulative keys for setting up the amount of a transaction on said mechanism, a key restoring device for said mechanism, a main actuator for said mechanism, a handle for operating said main actuator, and means intermediate said handle and said key restoring device for actuating the latter and including a shaft longitudinally movable on the main actuator, and a cam on said shaft adapted to be placed in cooperation with said key restoring device.

15. In an adding and listing machine, the combination of accumulating and listing mechanism, manipulative keys for setting up the amount of a transaction on said mechanism, a key restoring device for said mechanism, a main actuator for said mechanism, a handle for operating said main actuator, said handle being operable to actuate the key restoring device previous to movement of the main actuator for operating the accumulating and listing mechanism, and means intermediate said handle and said key restoring device for actuating the latter and including a shaft longitudinally movable on the main actuator and a cam on said shaft placed in cooperation with the said key restoring device.

16. In a listing machine, the combination of listing mechanism, manipulative means adapted to be set to control the said listing mechanism for ordinary listing operations, main operating means for said mechanism including a main actuator, a handle to be grasped for moving said actuator, and means operable from said handle previous to the movement of the main actuator by the handle for effecting normalization of the manipulative means aforesaid.

17. In a machine of the class described, the combination with mechanism for performing regular accounting transactions, and a main actuator therefor, of means for controlling different irregular transactions of said mechanism including a handle for moving the actuator for both regular and irregular transactions of the machine, and means to differentially limit the movement of the handle when actuated to predetermine an irregular transaction of the machine.

18. In a machine of the class described, the combination with mechanism for performing regular accounting transactions, and a main actuator therefor, of means for controlling different irregular transactions of said mechanism including a handle for moving the actuator for both regular and irregular transactions of the machine, and a stop device on the actuator movable to differentially limit the movement of the handle when actuated to predetermine an irregular transaction of the machine.

19. In an adding and listing machine, the combination of accumulating and listing mechanism, manipulative keys for setting up amounts on said mechanism, a main actuator comprising a crank, total and subtotal control devices coacting with the accumulating and listing mechanism, and means on the crank to cause operation of either of said devices and simultaneously lock the other against operation.

20. In an adding and listing machine, the combination of accumulating and listing mechanism, manipulative keys for setting up amounts on said mechanism, a main actuator comprising a crank, total and subtotal levers coacting with said accumulating and listing mechanism, operating slides for said levers, and cam means on the crank to selectively control operation of said slides, the slides being so constructed that operation of one lever by its slide results in locking of the other lever against simultaneous operation.

21. In an accounting machine, accounting mechanism, operating means therefor including manipulative devices to predetermine a regular operation of the machine, and a main actuator for effecting said operation comprising a handle adapted to be grasped for said actuator, means to compel an irregular action of the accounting mechanism, means on the main actuator to render the compelling means active adapted to be selected and operated by a continuous movement of the handle in one direction.

22. In an accounting machine, the combination with accounting mechanism, predetermining means controlling the same, and a main actuating device operable for effecting regular operations of said mechanism for handling transactions of the machine as determined by said predetermining means, of means on said device adapted to be actuated by the action of grasping the handle and controllable at will to cause operation of the accounting mechanism other than that normally effected incident to the functioning of the predetermining means.

23. In an accounting machine, account mechanism, manipulative setting means and crank operating means therefor, an adjustable handle means for said crank, and repeat control means operable by adjustment of the handle means.

24. In an accounting machine, accounting mechanism, manipulative setting means and crank operating means therefor, repeat control means for said accounting mechanism, handle means to actuate said crank constructed so that when grasped in one way the repeat control means will be operated and when grasped in another way said repeat control means will remain inactive.

25. In an accounting machine, accounting and listing mechanism, a manipulative setting means, crank operating means, repeat control means for said accounting and listing mechanism, means adapted to be operated when the handle means is grasped in one way whereby to operate the repeat control means, and means adapted to be operated when the handle means is grasped in another way whereby to control action of the listing mechanism.

26. In an accounting machine, accounting and listing mechanism, manipulative setting means therefor, and a main operating crank cooperative with the said mechanism and setting means, handle means for said crank, and means common to the setting means and to the listing mechanism operable incident to movement of the handle means in one way to control the action of the setting means and operable incident to movement of the handle means in another way to control the action of the listing means.

27. In an adding machine, accumulating mechanism, setting means therefor, operating means including a main actuator, means controlling repeat operation of the accumulating mechanism, a handle to operate said actuator, means adapted to be actuated incident to grasping the handle to govern the action of the repeat control means aforesaid, and total taking mechanism also controlled from the last means above mentioned.

28. In an accounting machine, accounting mechanism, keys for setting said accounting mechanism for operation, a main actuator, repeat controlling mechanism whereby to effect repetition of an operation of the accounting mechanism as predetermined by the setting keys, means on said main actuator operable independently of the latter, and means adapted to be actuated by the last named means for cooperation with the repeat control mechanism whereby to predetermine special action of the latter.

29. In control mechanism for accounting and like machines, manipulative keys for predetermining accounting operations, locking means for the keys, a main actuator, release means operable by the main actuator to restore the keys, and control means on said actuator operable to prevent operation of the release means.

30. In control mechanism for accounting and like machines, manipulative keys for predetermining accounting operations, locking means for the keys, a main actuator, total taking mechanism operable by said actuator, and control means on the actuator governing the action of said total taking mechanism.

31. In control mechanism for accounting and like machines, manipulative keys for predetermining accounting operations, a main actuator, listing mechanism controlled from the keys and operable by said actuator, and control means on the actuator operable preliminary to operation of the latter for governing the abnormal action of said listing mechanism.

32. In an adding and listing machine, adding mechanism, listing mechanism, manipulative keys for predetermining the action of said mechanisms, a main operating crank for said mechanisms, release means for said keys controlled by the crank, totaling devices controlling total taking cooperation of the aforesaid parts, handle means for said crank, and means operated from said handle means to prevent release action of the release means aforesaid or to cause adjustment of the totaling devices for total taking purposes.

33. In an adding and listing machine, adding mechanism, listing mechanism, a main actuating crank, manipulative devices to predetermine the action of said mechanisms, a locking means for the manipulative devices to hold same depressed when actuated, means to release said locking means, totaling means controlling total taking action of the adding and listing mechanisms, an actuating member on the crank adapted to cooperate with both the totaling means and said release means, and handle means on said crank connected with said actuating member to shift the same into cooperation with the totaling means or the release means.

34. In an adding and listing machine, the combination of adding mechanism, listing mechanism, manipulative keys to set said mechanisms for ordinary accumulating and listing operations, a main actuator for said adding and listing mechanisms, means to lock the keys when actuated, means to release said keys, means to compel abnormal action of the adding and listing mechanism for special transactions of the machine, and means on said main actuator to control the release means and said abnormal action compelling means.

35. In an adding and listing machine, the combination of adding mechanism, listing mechanism, total taking means cooperative therewith, predetermining keys for said mechanisms, locking and release means for said keys, a main operating crank for the mechanisms, an actuating member on the crank, an actuating plate on said crank operable by said member when moved in one way to govern the operativeness of the total taking means, and other means operable by said actuating member when moved in another way to interfere with the action of the key release means.

36. In an accounting machine, accounting mechanism, manipulative setting means and crank operating means therefor, and means on said crank operable preliminary to movement of the crank for predetermining repeating action of the accounting mechanism.

37. In an accounting machine, total taking mechanism, manipulative setting means and crank operating means therefor, and means on said crank operable preliminary to movement of the crank for predetermining totaling action of the total taking mechanism.

38. In an accounting machine, accounting mechanism adapted for repeating and total taking operations, manipulative setting means and crank operating means therefor, and means on said crank operable preliminary to movement of the crank for predetermining repeating and totaling actions of the accounting mechanism.

In testimony whereof I affix my signature.

JOHN F. ROBB.